United States Patent Office 2,698,826
Patented Jan. 4, 1955

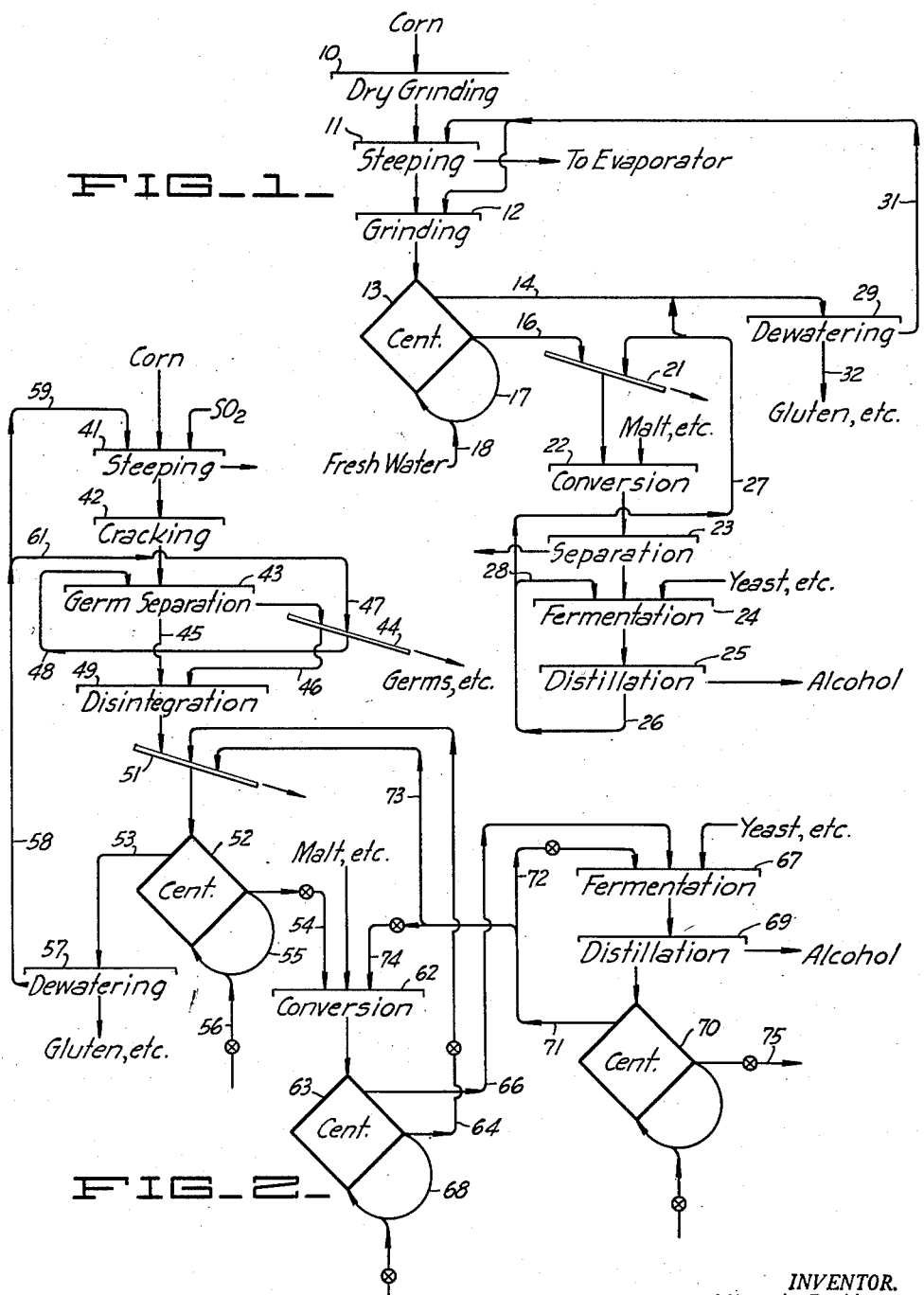

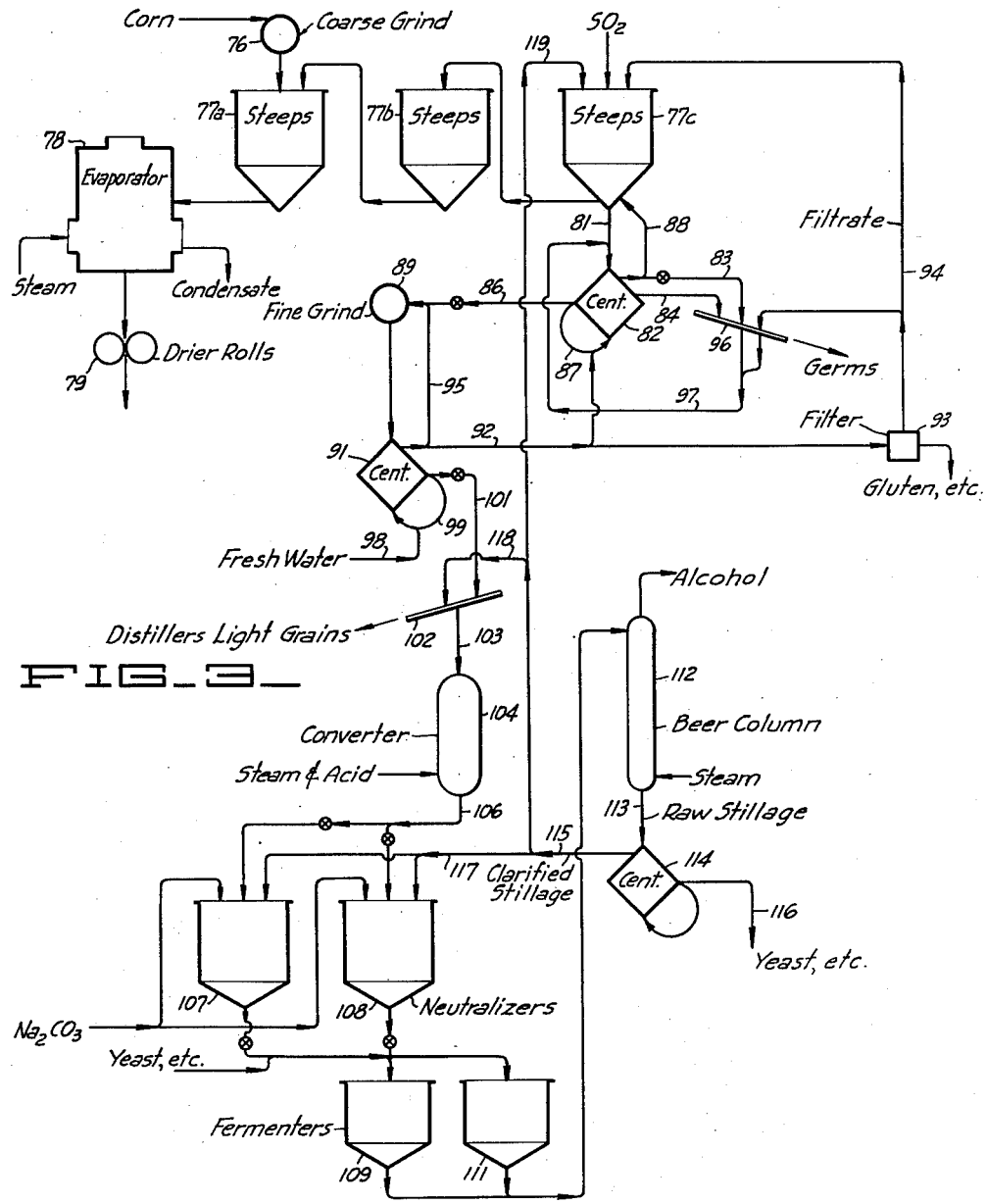

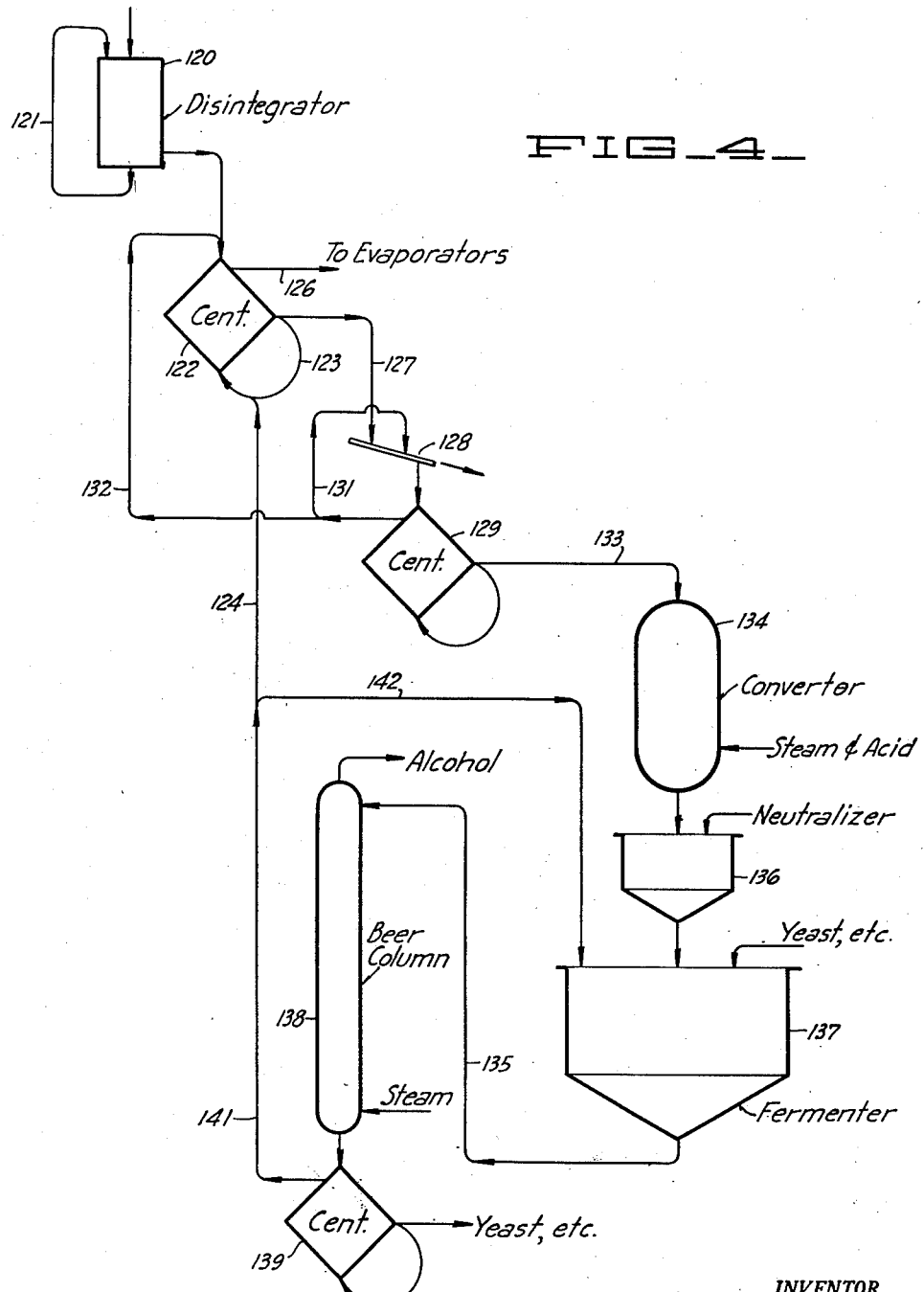

2,698,826

ALCOHOL MANUFACTURING PROCESS

Albert Peltzer, Sr., San Francisco, Calif., assignor to Merco Centrifugal Co., San Francisco, Calif., a corporation of California Application February 13, 1951, Serial No. 210,661

10 Claims. (Cl. 195—15)

This invention relates generally to processes for the manufacture of alcohols from corn or like starch bearing material. More particularly it relates to the manufacture of ethyl alcohol by the distillery industry.

The conventional procedure for the manufacture of ethyl alcohol from corn involves use of dry ground corn and other starch bearing vegetable material to prepare a mash, which is treated in a converter to form a wort for fermentation. The fermented wort is than subjected to distillation for recovery of alcohol. In the converter the starch content is changed to sugar usable as a yeast food in the fermentation operation. The converting operation may employ the diastase of malt, to change the starch into maltose, or mineral acid may be used together with pressure and high temperature to convert starch into dextrose. The liquor discharged from the distillation operation after the alcohol recovery is commonly known as slop or stillage, and contains solids in solution and in suspension. A portion of this stillage is commonly used for backslopping in the fermentation operation, and the remainder is subjected to evaporation for the recovery of the solids content in dry form. In such conventional processes fresh water is supplied to the converter or to the ground grain immediately prior to introducing the same into the converter. In modern plants practically all of this water is removed from the stillage by evaporation. In less modern plants a considerable amount of such water is wasted and is discharged to the sewer together with solubles.

The above described conventional processes have known inherent disadvantages. Particularly the fresh water consumption is relatively high, and this makes for high cost of evaporating water from the removed stillage. The gluten content of the corn and like readily soluble material remains in the wort and passes through the fermenting and distillation operations. The presence of large amounts of gluten and solubles in the fermenting and distillation operations is deemed objectionable, particularly in that it necessarily increases the amount of material being handled in these operations, and also because it lends to contamination of the equipment involved. The presence of germs (i. e. corn germs) throughout the process is likewise objectionable, and does not increase the yield of alcohol. The presence of germs greatly increases the tendency of liquors to foam, thus making it difficult to handle the liquors in modern equipment, such as centrifuges. In addition retention of germs throughout the process makes impossible the recovery of the valuable by-products, such as corn oil.

It is an object of the present invention to provide an improved process for the production of alcohol from corn and other starch bearing material, which will overcome certain or all of the above outlined defects.

More particularly it is an object of the present invention to provide a process of the above character which will be relatively economical in its fresh water consumption, and which will be a bottled up system with respect to its water requirements. In this connection the invention is particularly applicable to starch bearing materials of the root type.

Another object of the invention is to provide a process of the above character in which one or more essential operations are carried out by centrifugal separation.

Another object of the invention is to provide a process of the above character in which fresh water is introduced in a centrifugal separating operation applied for the separation of starch from gluten, and which is interposed in the process prior to conversion of the starch.

It is another object of the invention to provide a novel process of the above character involving the removal of germs from the system, thus making possible the separate recovery of valuable by-products, such as corn oil, and avoiding undesirable foaming in various process operations.

Another object of the invention is to improve the fermentation operation of such processes by the use of a clarified liquor for back slopping.

Additional objects and features of the invention will appear from the following description in which the preferred embodiments of the invention are set forth in detail in conjunction with the accompanying drawing.

Referring to the drawing:

Figure 1 is a flow sheet illustrating one manner of carrying out the present invention.

Figure 2 is a flow sheet illustrating another embodiment of the invention.

Figure 3 is a flow sheet illustrating a third modification of the invention.

Figure 4 is a flow sheet illustrating another modification of the invention.

The relatively simple procedure outlined in Figure 1 of the drawing consists in dry grinding corn at 10, in substantially the same manner as dry grinding is now practiced in the industry. It will be noted however that malt is not added in the customary manner following the dry grinding. Following dry grinding the material is subjected to the steeping operation 11, which serves to soften the starch grains, and to facilitate subsequent separation between starch particles and gluten. This steeping can be carried out in a manner similar to that now being practiced in the cornstarch industry, wherein the corn is soaked in steeps at a temperature of the order of 100 to 120° F., for a period of time which may range from say 20 to 30 hours. Sulphur dioxide is generally supplied to aid softening and to minimize bacterial contamination. The free steep water is removed from the steeping operation, and can be subjected to evaporation for recovery of the solids content. The steeped material is subjected to further grinding and oversize screening at 12 to produce a magma suitable for centrifugal treatment. The magma for example may be of a specific gravity ranging from 5 to 14 Baumé. For the centrifugal separating operation 13 I have diagrammatically illustrated a centrifuge of the type disclosed in Patents 1,945,786 and 2,323,077 and manufactured by Merco Centrifugal Company of San Francisco under the trade name of "Merco." Such a centrifuge is characterized by an underflow return circuit whereby the major part of the underflow material is continuously returned into the machine. Likewise such a machine is capable of operating continuously, with continuous discharge of overflow and underflow materials. Line 14 represents the overflow drawoff, line 16 the underflow, and line 17 the underflow return.

Assuming that corn is used exclusively as a source of starch bearing grain, the magma after grinding and oversize screening at 12 will in a typical instance contain about 10% starch and 2% gluten. In the centrifuge 13 a separation takes place between starch and gluten. The bulk of the gluten passes out in the overflow 14, together with most of the solubles, while substantially all of the starch particles pass out in the starch underflow 16.

In conjunction with centrifugal separation we introduce a fresh wash water as indicated by line 18 to block solubles from the underflow. This wash water can be introduced into the return circuit as described in said Patent 1,945,786, and when so introduced it enters the centrifugal separating zone of the centrifuge, and serves to displace solubles from the underflow into the overflow. Assuming that the amount of fresh water added by way of line 18 is substantially equal to the water being removed in the underflow drawoff, then the displacement of solubles from the underflow is theoretically about 100%, and such solubles are removed in the overflow 14. Preferably the amount of wash water used is somewhat greater than the amount of water removed in the underflow drawoff 16, thus providing an upflow condition in the separating chamber of the rotor.

The underflow drawoff 16 contains some oversize material which is removed in the screening operation 21. The screened material is then subjected to the starch converting operation 22, which can be carried out in a conventional manner by first cooking the slurry after which malt and other additives are added. For effective conversion the material must then be held at an elevated temperature of about 150° F. The mash resulting from conversion is shown being subjected to the separating or clarifying operation 23, which serves to remove suspended solids, to form a wort. The wort is then supplied to the fermentation operation 24, where yeast and other additives are supplied, and the material permitted to ferment in the customary manner. The fermented material from operation 24 is then supplied to the distillation operation 25, which can be carried out by the use of a conventional beer still. Alcohol is removed for condensation and further treatment. The stillage 26 is returned to the process. Thus a part 27 of this stillage is shown being used as a wash on the screen 21, and another part 28 is shown being used as back slop for the fermentation operation 24.

The overflow 14 from the centrifugal separating operation 13 is subjected to dewatering at 29, to produce a relatively clean water 31 for use in the steeping and grinding operations 11 and 12. A concentrated gluten drawoff 32 is removed from the dewatering operation, and can be treated to conventional methods for the recovery of dry gluten.

The process described above has many advantages not possessed by conventional processes. Because the starch is not converted until after centrifugal separating treatment 13, it is possible to make a relatively good separation which removes substantially all of the starch, free of the major part of the fiber and gluten content. It may be noted at this point that it may be desirable to retain a certain amount of gluten in the material being subjected to fermentation. However this amount is considerably less than that present in the starch magma being submitted to centrifugal separation. Thus of the total gluten content in the magma, it is possible to remove over 50%, or say from 50 to 70% leaving (if desired) the remaining gluten with the starch in the underflow.

Application of fresh water to the centrifugal separating operation, greatly facilitates the results desired. As previously pointed out by application of fresh water at this point of the process it is possible to displace the majority of solubles into the overflow 14, whereby said solubles do not interfere with the remaining steps of the process, but are largely returned to the steeping operation 11, to be ultimately removed with the steep liquor to the evaporators.

As indicated in the flow sheet a water balance can be maintained whereby all of the water required for steeping can be obtained from the wash 18. Contrary to conventional practice the stillage from the distillation operation 25 is not sent to the evaporators, but is returned for use in the process, preferably for use in steps subsequent to centrifugal separation. The solids being removed in the separating operation 23 can be sent to the evaporators and driers together with liquor from steeping 11, or if desired this can likewise be returned to the process, as for example upon the screen 21.

In the process as set forth in Figure 1, the germs of the corn are permitted to remain with the material undergoing treatment. The germs are present in operations 10 and 12, and largely pass out with the starch in the underflow 16. In order to minimize difficulties involved in foaming the centrifuge employed can incorporate a flotation vent box in its return circuit, as disclosed in Patent 2,039,605.

The process of Figure 1 can be applied to starch bearing vegetable materials other than grains. Thus it can be applied to starch bearing roots such as dried potato culls.

Figure 2 illustrates another embodiment of the invention in which germs are removed after steeping of the corn and before removal of the gluten content. Thus the corn without preliminary cracking or grinding is subjected to steeping at 41, similar to the manner in which corn is steeped in conventional cornstarch processes. Liquor removed from the steep is shown being sent to the evaporators, for the recovery of the solid content in dry form. The steeped corn is then subjected to cracking at 42, after which the cracked material is subjected to the wet germ separating operation 43. This wet germ separation can likewise be carried out in the same manner as practiced in the wet cornstarch process, and in general may involve a flotation operation for the removal of germs from the starch and fibrous material. Screen 44 diagrammatically represents a final screening and washing of the removed germs. Lines 45 and 46 represent starch magma drawoffs from the germ separating operation, and which are merged to form a magma for further treatment. A wash 47 is shown being supplied to the screening operation 44, and more diluted material from the screen 44 is shown being returned by line 48 to the germ separating operation. The germ free material from the germ separating operation is subjected to further disintegration or grinding at 49, to produce a magma suitable for centrifugal separating treatment. Preferably this magma is subjected to screening at 51, for the removal of oversize coarse material. The magma passing through the screen 51 is supplied as a feed to the centrifugal separating operation 52. Lines 53, 54 and 55 represent respectively a gluten overflow drawoff, a starch underflow drawoff, and an underflow return circuit, as previously explained with respect to the separating action 13 of Figure 1. Also wash water 56 is introduced into the centrifugal separating operation.

The gluten overflow 53 is dewatered at 57, to supply a liquor 58 which can be used in part (59) to supply the water requirements for steeping, and in part (61) as a wash water 47 in the screening operation 44.

The underflow 54 is supplied to the conversion operation 62 where malt and other additives are provided and the material treated for conversion of the starch to maltose. The converted material is then supplied to the second centrifugal separating operation 63, which can likewise be carried out by a centrifuge of the Merco type. This centrifuge serves to remove suspended solids in the underflow 64, and supplies a clarified overflow 66 which forms the wort for the fermentation operation 67. The separating operation 63 is likewise preferably carried out with an underflow circuit 68 as previously described. However in this instance it is not necessary to use wash water.

The underflow 64 can be returned to the process as illustrated. Thus it is shown being supplied to the screen 51, whereby it merges with the feed to the separating operation 52. From the fermentation operation 67 the material passes to the distillation operation 69, from which the desired alcohol is removed. Stillage from operation 69 is shown being supplied to a third centrifugal separating operation 70, which can likewise be carried out by a machine of the Merco type. The overflow 71 from this operation is shown being supplied in part (72) as back slop for the fermentation operation 67, in part (73) as wash on screen 51, and in part (74) as an added liquid content to the conversion operation 62. The underflow 75 from the centrifugal separating operation 70 contains a high percentage of solids, and can be further treated for the recovery of valuable by-products. The amount of water removed at this point is relatively small, and can be substantially equal to the amount of water added by way of steam introduced in the distillation operation 69.

In general the embodiment of Figure 2 makes possible a substantial over-all economy in that the germs removed from the starch bearing material can be processed for the recovery of corn oil and other valuable by-products.

With certain modifications the process of Figure 2 is applicable to conversion by acid at an elevated temperature and under pressure, in place of conversion by the action of malt. Thus the underflow 54 from the centrifugal separating operation 52 can be supplied directly to an acid converter, and the converted material from this equipment can be supplied directly to the fermentation operation 67, after addition of a suitable neutralizer, such as sodium carbonate. With such modification it is possible to eliminate the centrifugal separating operation 63. Also it is unnecessary to divert part of the overflow 71 for use in the conversion.

The flow sheet of Figure 3 illustrates another embodiment of the invention in which the corn is ground prior to steeping, but in which germs are removed before centrifugal separation of gluten from starch. In this flow sheet the equipment has been illustrated in schematic form. Thus the corn is shown being supplied to the coarse grinder 76, and the ground material supplied to the steeping stages 77a, 77b and 77c. Liquor is shown being drawn from the stage 77a to the evaporator system 78. This system can include the customary evaporator as indicated, followed by a roll type drier 79. The steeping stages can be in countercurrent relation, with liquor drained from 77c being supplied to 77b, and liquor from 77b to 77a. Rather than to progress the material undergoing steeping through successive steeping tanks, a batch is permitted to remain in one steep through the successive steeping stages, by the use of a suitable system of valve controlled piping as is well known to those familiar with steeping operations.

Line 81 represents removal of the steeped material to form a feed to the centrifuge 82. The centrifuge 82 is of the Merco type, although it is modified to provide two overflow drawoffs in place of one. The lines 83 and 84 represent the two overflow drawoffs, line 86 the overflow, and line 87, the underflow return. The overflow 83 is a relatively clarified liquor, and a part 88 of this overflow is utilized to sluice ground and steeped material from the last steeping stage 77c, and to form a material of proper gravity to feed the centrifuge 82. The underflow 86 contains the starch particles and is subjected to one or more stages of grinding, in a suitable mill 89. The mill employed for this operation can be one of the high speed hammer type, such as is manufactured and sold under the trade name of "Rietz" (see Patents Nos 2,153,590 and 2,325,426). The ground material from mill 89 is shown being supplied to the centrifuge 91, which is likewise of the Merco type, but provided with a single overflow discharge. The overflow 92 from this machine contains a major part of the gluten and is dewatered in a gluten filter 93. The water thus derived from the overflow is returned by line 94 to the steeps. In order to aid operation of the disintegrating or grinding mill 89, another part 95 of the gluten overflow can be returned continuously to mill 89, thus forming in effect a repulping circuit.

The middle overflow drawoff 84 from the centrifuge 82, contains a major part of the germs, and is shown being supplied to the screens 96, whereby the germs are removed. Material 97 passing through the screens 96, which contains considerable starch, is shown being returned to make up feed to the machine 82. The overflow 83 is shown being used as a wash on the screens 96.

Wash water 98 is shown being supplied to the return circuit 99 of the centrifuge 91. The underflow drawoff 101 is supplied to the screens 102, for the removal of coarse material, and the magma 103 which passes through the screens is supplied to the acid converter 104. The material 106 from the converter 104, the starch content of which has been converted to dextrose, is supplied to the storage or neutralizer tanks 107, 108, where the acid is neutralized as by addition of sodium carbonate as indicated. The neutralized material from tanks 107, 108 is shown being supplied to the batch fermenters 109, 111, together with yeast additives and further chemical for correction of the pH value. From the fermenters 109 and 111, the fermented material is supplied to the beer column 112 as indicated. From this beer column alcohol is removed for further treatment, and the stillage drawoff 113 is supplied to the centrifuge 114. This centrifuge is likewise one of the Merco type, and is operated primarily for clarification. The overflow 115 is of clarified liquor which is used in operations preceding distillation. The underflow drawoff 116 contains yeast and other suspended solids of the stillage, and can be sent to the evaporators or other equipment for recovery of the solids content. The amount of water removed at this point can be a minor fraction of the amount of water contained in the drawoff to the evaporators 78. While the overflow 115 can be used in various steps of the process, one part 117 is shown being employed in the neutralizing tanks 107, 108, another part 118 as a wash on the screens 102 and a third part 119 to the last steeping stage 77c. This third part can likewise be used to sluice out steeped ground material from the last steeping stage, and to supply a sufficient amount of water to the steeped material to make up a feed of proper gravity for the centrifuge 82.

It will be evident that the process of Figure 3 greatly facilitates the removal of germs from the starch bearing material, and obviates the use of more elaborate germ separating means such as indicated in Figure 2. The use of the centrifuge 114 to clarify the stillage provides a clarified liquor which is useful in various preceding operations, without the disadvantages attendant upon direct use of the stillage with its high content of yeast and other solids. With the process of Figure 3 it is possible to provide a substantially completely bottled up system, in which all of the fresh water is supplied to the centrifuge 91, and which water is removed from the process only by way of steep water drawoff to the evaporator 78, and drawoff of water with the underflow 116.

Figure 4 illustrates a process incorporating certain features of the present invention, and which employs tubers such as Irish potatoes as a source of starch. As illustrated raw potatoes are supplied to the disintegrator 120, and the slurry produced by this disintegrating operation is supplied as a feed to the centrifuge 122 of the Merco type. As indicated by the return circuit 123 a large part of the underflow is continuously returned to the machine together with the wash 124. The overflow 126 contains solubles and colloids which are displaced from the magma, and is supplied to the evaporators. The underflow drawoff 127 is shown being screened at 128 for removal of oversize particles, and is then supplied as a feed to the second centrifugal separating stage 129, which can likewise be carried out by a machine of the Merco type. Fresh wash water can be supplied to the underflow return of this machine. One part 131 of the overflow from stage 129 is shown being used as a wash in the screening operation 128, and another part 132 is shown being used to dilute the feed to the first stage centrifugal operation 122.

The underflow drawoff 133 from the stage 129 is shown being supplied to the converter 134, which may be of the acid type as previously described. The material from the converter is neutralized at 136, as by addition of sodium carbonate, and the neutralized material then supplied to the fermenter 137, where yeast and fermentation nutrients can be added. The fermented material 135 is supplied to the beer column 138 or other distillation apparatus employed, where the alcohol is removed as indicated. The raw stillage removed from the beer column 138 is shown being supplied to the centrifuge operation 139, which can be similar to the centrifuge operation 114 of Figure 3. Clarified stillage liquor 141 obtained as an overflow from 139 is shown being used in part (142) for back slopping in the fermenter 137, and in part to make up the wash 124 for the centrifuge operation 122.

The disintegrating operation 120 is preferably carried out by the use of a suitable mechanical disintegrator capable of reducing raw potatoes to a slurry suitable for feeding the first centrifuge stage 122 when diluted by overflow 132 from the stage 129. It is satisfactory for this operation to use a machine of the above mentioned Rietz type. The secondary discharge from the lower end of the disintegrating zone of this machine can be returned to the feed as indicated by line 121.

A feature of the process illustrated in Figure 4 is that it requires only a minor amount of fresh water, in comparison to the large amount of fresh water needed with conventional starch recovery from tubers which precludes economical recovery of solubles by means of evaporation. Thus the components are processed in liquor derived from the juice of the raw potatoes. A substantial amount of the solubles and colloids in the slurry from the disintegrating operation are removed in the overflow 126 from the first centrifuge stage 122. Raw stillage from 138 is clarified by centrifuge operation 139 to produce a clarified liquor suitable for back slopping, and as wash in preceding separating and processing operations.

I claim:
1. In a process for manufacture of alcohol from vegetable starch bearing material containing proteinaceous solubles wherein the starch bearing material is employed to produce a material containing converted starch which is fermented and subjected to distillation, the improvement comprising subjecting the starch bearing material to treatment to form a magna containing solubles and unconverted starch particles, subjecting said magna to centrifugal separation to thereby provide an overflow material containing the major part of the solubles and an underflow containing the starch, continuously introducing a fresh water wash into the zone of centrifugal separation to displace solubles into the overflow, and treating the underflow for conversion of its starch content to thereby form a material suitable for fermentation.

2. In a process for manufacture of alcohol from starch bearing grain wherein a wort containing converted starch is formed from the grain, the wort being thereafter fermented and subjected to distillation, the improvement comprising steeping the grain without substantial conversion of its starch content and grinding the material to form a magma for further treatment, subjecting the magma to centrifugal separation to thereby provide an overflow material containing the major part of the gluten and an underflow material containing the starch, introducing a fresh water wash into the zone of centrifugal separation to displace solubles from the underflow, and utilizing water derived from the overflow for said steeping operation.

3. In a process for manufacture of alcohol from starch bearing grain wherein a material containing converted starch is formed from the grain, the improvement comprising steeping the grain without substantial conversion of its starch content, subjecting the steeped material to grinding to form a magma for further treatment, subjecting the magma to centrifugal separation to thereby provide an overflow material containing the major part of the gluten and an underflow material containing the major part of the starch, introducing a fresh water wash into the separating zone to displace solubles from the underflow, utilizing water derived from the overflow in said steeping operation, treating the underflow material for conversion of its starch content and to form a wort for fermentation, fermenting the wort, subjecting the fermented wort to distillation, and utilizing stillage liquor from distillation in operations preceding distillation.

4. In a process for manufacture of alcohol from starch bearing grain wherein the grain is employed to produce a material containing converted starch which is fermented and then subjected to distillation, the improvement comprising steeping the grain without conversion of its starch content, cracking the steeped material, removing germs from the cracked material, subjecting the cracked material to grinding to form a magma for further treatment, subjecting the magma to centrifugal separation to thereby provide an overflow material containing the major part of the gluten and an underflow material containing the starch, introducing fresh water wash into the zone of centrifugal separation to displace solubles from the underflow, subjecting the underflow to treatment including conversion to form a material for fermentation, and utilizing water derived from the overflow of the centrifugal separating operation in said steeping and germ separating operations.

5. In a process for manufacture of alcohol from starch bearing grain wherein the grain is employed to produce a material containing converted starch and which is fermented and subjected to distillation, the improvement comprising steeping the grain without conversion of its starch content, subjecting the steeped material to grinding to form a magma for further treatment, subjecting the magma to centrifugal separation to thereby provide an overflow containing the major part of the gluten and an underflow containing the starch, introducing fresh water wash into the zone of centrifugal separation to displace the major part of the solubles from the underflow, utilizing water derived from the overflow in said steeping operation, treating the underflow to convert the starch content of the same and to thereby form a material for fermentation, fermenting the last named material, subjecting the fermented material to distillation, subjecting stillage derived from the distilling operation to centrifugal separation to form a clarified overflow and an underflow of high solids content, and utilizing said clarified overflow in preceding steps of said process.

6. In a process for the manufacture of alcohol from starch bearing grain wherein the grain is employed to produce a material containing converted starch which is fermented and subjected to distillation, the improvement comprising steeping the grain without conversion of its starch content, subjecting the steeped material to grinding to form a magma for further treatment and which contains starch and gluten, subjecting the magma to centrifugal separation to thereby provide an overflow material containing the major part of the gluten and an underflow material containing the starch, introducing a fresh water wash into the zone of centrifugal separation to displace the major part of solubles from the underflow, utilizing water derived from the overflow in said steeping operation, treating the underflow material for conversion of its starch content and to form a material for fermentation, fermenting the last named material, subjecting the fermented material to distillation, subjecting distillage liquor derived from the distillation operation to centrifugal separation to form a clarified overflow and an underflow containing the major part of the solids of said stillage, and utilizing said clarified overflow for back slopping in said fermenting operation.

7. In a process for the manufacture of alcohol from tubers, the steps of subjecting the tubers to disintegration to produce a magma for further treatment, subjecting said magma to centrifugal separation whereby starch is discharged in an underflow and solubles discharged in the overflow, and then treating the underflow to starch conversion and fermentation.

8. In a process for the manufacture of alcohol from potatoes, the steps of subjecting the tubers to disintegration to produce a magma for further treatment, subjecting said magma to centrifugal separation whereby starch is discharged in an underflow and solubles discharged in the overflow, subjecting the underflow to further centrifugal separation whereby starch is withdrawn in an underflow and a liquor withdrawn in an overflow, using liquor from said last overflow to dilute said magma, subjecting the last named starch underflow to starch conversion and fermentation to provide alcohol and stillage, subjecting stillage to centrifugal treatment to provide a clarified liquor, and using said last liquor as wash in the first centrifuge operation and for back slopping.

9. In a process for the manufacture of alcohol from starch bearing grain, treating the grain to operations including steeping to form a coarsely ground and steeped magma containing unconverted starch particles, gluten, solubles and germs, subjecting said magma to centrifugal separation to provide an underflow containing the bulk of the starch content, said underflow being centrifugally separated from and relatively free of gluten and germs, introducing fresh wash water into the zone of centrifugal separation to displace the major part of the solubles from the underflow, treating the underflow to convert the starch content of the same and to thereby form a material for fermentation, fermenting the last named material, subjecting the fermented material to distillation, subjecting stillage derived from the distilling operation to separating treatment to provide a clarified overflow, utilizing at least a substantial part of said clarified overflow in the steeping operation, removing steep water from the steeping operation, and subjecting said steep water to evaporation to form a dried material containing solids derived both from steeping and from the fermentation and distillation operations.

10. In a process for the manufacture of alcohol from corn, treating the corn to operations including steeping to form a coarsely ground and steeped magma containing unconverted starched particles, gluten, solubles and germs, subjecting the magma to centrifugal separation to provide an underflow containing the bulk of the starch content, said underflow being centrifugally separated from and relatively free of gluten and germs, introducing fresh wash water into the zone of centrifugal separation to displace the major part of the solubles from the underflow, treating the underflow to convert the starch content of the same and thereby form a material for fermentation, fermenting the last named material, subjecting the fermented material to distillation, subjecting stillage derived from the distilling operation to centrifugal separation to provide a clarified overflow, utilizing at least a substantial part of said clarified overflow in the steeping operation, removing steep water from the steeping operation and subjecting the steep water to evaporation to form a dried material containing solids derived both from steeping and from the fermentation and distillation operations.

References Cited in the file of this patent

UNITED STATES PATENTS

| | | |
|---|---|---|
| 474,942 | Blumer | May 17, 1892 |
| 495,956 | Bradley | Apr. 25, 1893 |
| 2,340,316 | Earle | Feb. 1, 1944 |
| 2,343,706 | Reich | Mar. 7, 1944 |

FOREIGN PATENTS

| | | |
|---|---|---|
| 2,840 | Great Britain | of 1881 |